United States Patent
Reynolds

Patent Number: 5,269,194
Date of Patent: Dec. 14, 1993

[54] TRANSMISSION MAINSHAFT THRUST WASHER COMBINATION

[75] Inventor: Joseph D. Reynolds, Climax, Mich.

[73] Assignee: Eaton Corporation, Cleveland, Ohio

[21] Appl. No.: 997,622

[22] Filed: Dec. 28, 1992

Related U.S. Application Data

[63] Continuation-in-part of Ser. No. 889,574, May 28, 1992, abandoned.

[51] Int. Cl.⁵ .............................................. F16H 3/08
[52] U.S. Cl. ......................................... 74/363; 74/333; 74/410
[58] Field of Search ............... 74/333, 357, 359, 363, 74/374, 375, 410; 192/48.8, 48.9, 48.91; 384/424, 903

[56] References Cited

U.S. PATENT DOCUMENTS 3,500,695 3/1970 Keiser .............................. 74/359 X
4,104,928 8/1978 Vandervoot ..................... 74/359 X
4,949,589 8/1990 Reynolds ............................. 74/363

Primary Examiner—Allan D. Herrmann
Assistant Examiner—David W. Laub
Attorney, Agent, or Firm—A. E. Chrow

[57] ABSTRACT

A thrust washer combination employing three thrust washers (28, 70 and 72) is provided for maintaining separation between and for transferring axial thrust to a mainshaft (2) that has been imparted to either one adjacent floating mainshaft gears (12, 18) of a change gear transmission (100) respectively by a clutch assembly (20) or (22) during the process of selectively clutchingly engaging one of gears (12, 18) to the mainshaft to effect the rotation thereof. Gears (12) and (18) have respective adjacent flanges (42) and (44) that extend towards mainshaft (48) with thrust washer (28) being contained in an annular groove (42) therebetween and keyed for rotation with mainshaft (2) and thrust washers (70) and (72) positioned on opposite sides of flanges (40, 42) and held thereagainst by retaining rings (74) and (76) respectively.

6 Claims, 2 Drawing Sheets

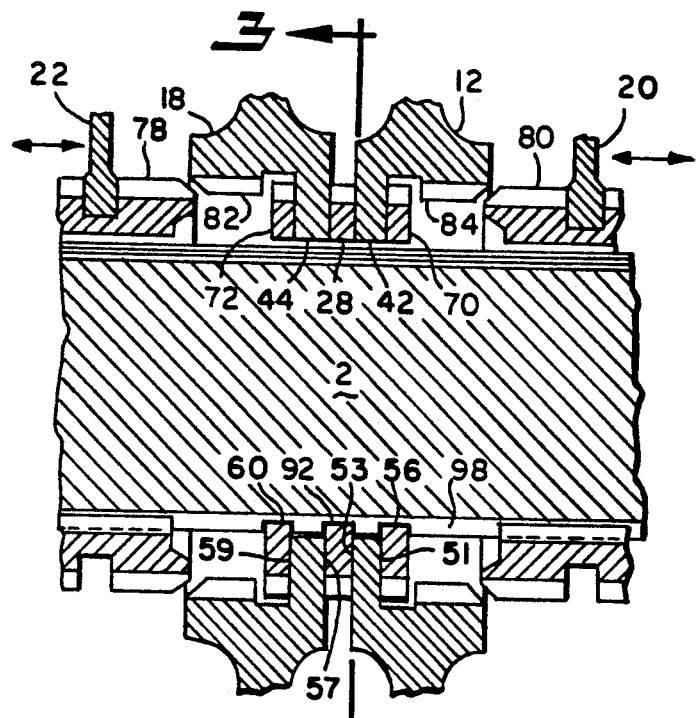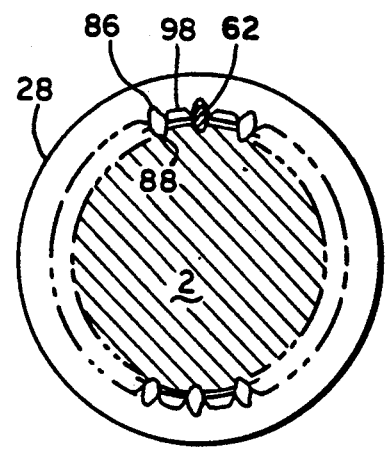
PRIOR ART
Fig. 2
PRIOR ART
Fig. 3
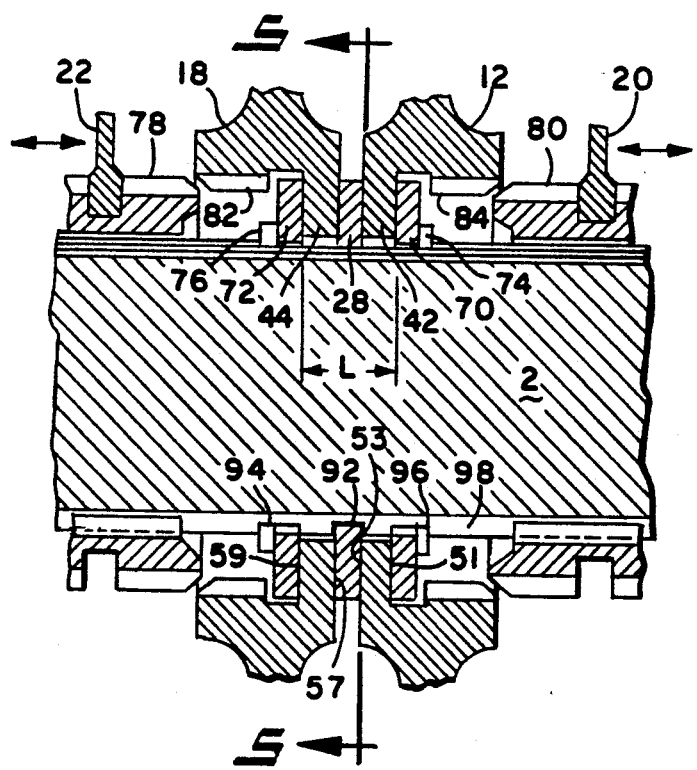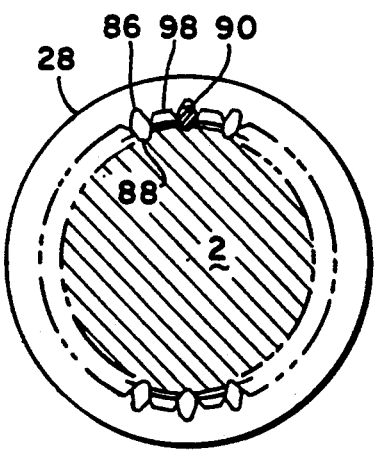
Fig. 4
Fig. 5

TRANSMISSION MAINSHAFT THRUST WASHER COMBINATION

This application is a continuation-in-part, of application Ser. No. 889,574, filed May 28, 1992 now abandoned.

This invention relates generally to an improved combination of thrust washers operative to transmit axial thrust to the mainshaft of a vehicular transmission that has been imparted to a floating mainshaft gear by sliding clutch assembly during the process of clutching the gear to the mainshaft rather that to an adjacent floating mainshaft gear and more particularly to a three thrust washer combination that utilizes a shortened key that is rotarily driven by the mainshaft splines and is held axially between the two outer thrust washers in a manner eliminating the practice heretofore of having to remove a tooth from the clutch assembly.

BACKGROUND OF THE INVENTION

Transmissions featuring floating transmission mainshaft gears such as associated with twin countershaft transmission are well known and examples of which can be found in U.S. Pat. Nos. 3,237,472; 3,238,613; 3,425,290; and 3,885,446, the disclosures of which are incorporated herein by reference.

Such transmissions generally feature a plurality of floating mainshaft gears that encircle the mainshaft and are supported and driven by countershaft gears, typically two countershaft gears, that are mounted on a pair of countershafts disposed on opposite sides of the mainshaft.

The mainshaft gears are characteristically clutched to the mainshaft by means of a clutch mechanism that slides along external splines extending axially along the mainshaft and has radially inwardly extending teeth or splines that engage internal teeth or splines on the mainshaft gear so as to cause rotation of the mainshaft when the mainshaft gear is clutched thereto.

A problem long ago recognized has been the potential for transfer of axial thrust to a floating mainshaft gear being clutched to a mainshaft by an axially moving clutch assembly. In view of such, a variety of solutions have been devised over past years for transmitting axial thrust to the mainshaft that has been imparted to a mainshaft gear by an axially moving clutch assembly rather than a mainshaft gear adjacent the gear being clutched to the mainshaft.

Such solutions have generally been in the form of gear retainer(s) of one type of another that characteristically limit axial movement of the mainshaft gears to prevent them from engaging each other whether or not one of them is being clutched to the mainshaft.

One example of a retainer assembly for limiting axial movement of a transmission gear is disclosed in U.S. Pat. No. 2,397,905, the disclosure of which is incorporated herein by reference. Here however, a costly and expensive pivotal woodruff key is required to lock a thrust collar onto external splines of the mainshaft to prevent a gear from moving axially.

An example of a splined thrust washer for transmitting axial thrust from a gear set to a propeller drive shaft is disclosed in U.S. Pat. No. 3,894,621, the disclosure of which is incorporated herein by reference. Here, a splined thrust washer (52) is slid along the shaft splines to a transverse groove adjacent a stepped shoulder on the shaft and is held in place against the shoulder by a splined collar (30). Thrust washer (52) is operative to transmit axial thrust of only one gear to the propeller shaft and in addition to requiring the use of Collar (30), also requires costly and complex machining of a stepped configuration to the Propeller shaft exterior.

A more recent example of a transmission mainshaft gear retainer for preventing axial movement of two closely spaced gears to prevent transfer of axial thrust force therebetween is disclosed in U.S. Pat. No. 4,034,620, the disclosure of which is incorporated herein by reference. Here a thrust ring (104) is splined to the mainshaft between two adjacent gears and is held in place by means of snap rings (108, 110) on opposite sides thereof. The gears are further required to have costly and complex mating tongue and groove configurations that operate in conjunction with an additional snap ring (102) to limit movement of the gears away from each other.

An even more recent example of a three thrust washer combination for transmitting axial thrust imparted to a mainshaft gear to the mainshaft and upon which the present improvement is founded is disclosed in U.S. Pat. No. 4,949,589, assigned to the assignee of the present invention and the disclosure of which is incorporated herein by reference. Here, however, all three washers require relatively large width transverse grooves for their axial containment in the outer surface of the mainshaft as well as requiring that all three be secured for rotation with the mainshaft by a conventional prior art key that extends axially along one of the grooves in the mainshaft splines and into the clutch engagement region and thus requiring the removal of one of the clutch assembly teeth to enable the clutch assembly to slide axially over the key.

In contrast to the above, the present invention requires only one relatively wide width groove in combination with two narrow width grooves for containing a three thrust washer combination coaxially as well as requiring that only the middle thrust washer of the three thrust washers be secured to the mainshaft by a key and thus eliminating the requirement that a tooth be removed from the clutch assembly whereas the thrust washers respectively located on opposite sides of the middle thrust washer are able to utilize splines on the mainshaft for their respective securement and rotation therewith and are prevented from moving axially away from each other by retaining rings disposed inthe narrower width transverse grooves in the outer surface of the mainshaft.

SUMMARY OF THE INVENTION

The shortened key of the three thrust washer combination remains axially retained even when broken and is thus prevented from creating further damage whereas, in the past, broken keys were capable of creating catastrophic failure of the transmission and other components of the drive line.

Accordingly, it is an object of this invention to provide an improved thrust washer combination for transmitting axial thrust to a vehicular transmission mainshaft that has been selectively imparted by a clutch assembly to one of a pair of floating mainshaft gears encircling the mainshaft.

It is another object of this invention to provide a vehicular transmission having an improved thrust washer combination operative to transmit axial thrust to a mainshaft gear that has been selectively imparted to one of a pair of adjacent floating mainshaft gears encircling the mainshaft by a clutch assembly during the process of clutching the gear to the mainshaft.

BRIEF DESCRIPTION OF THE DRAWINGS

FIG. 2 is a partial central cross-sectional view of a prior art thrust washer combination;

FIG. 3 is an end view of the thrust washer combination of claim 2 taken along view line 3—3;

FIG. 4 is a partial central cross-sectional view of the embodiment of the thrust washer combination of the invention shown in FIG. 1; and FIG. 5 is an end view of the thrust washer combination of FIG. 4 taken along view line 5—5.

DESCRIPTION OF SOME PREFERRED EMBODIMENTS

Figure 1:
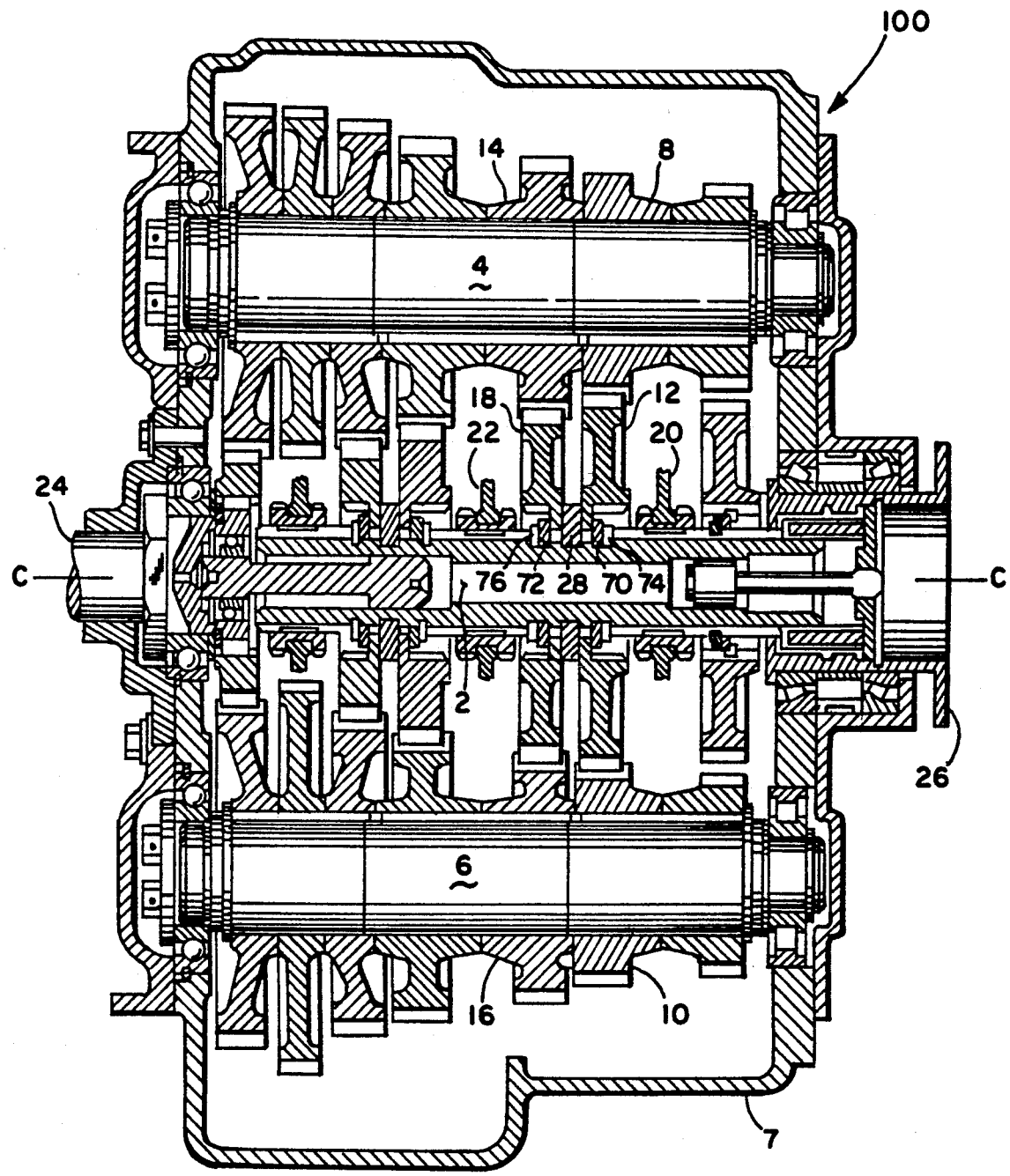
FIG. 1 is a central cross-sectional view of a vehicle transmission (100) utilizing the thrust washer combination of the invention.

Transmission 100 of FIG. 1 is a compound transmission of the type having a rotary mainshaft 2 that is journaled for rotation on a transmission housing generally referenced by numeral 7. Transmission 100 has a pair of rotary counter shafts 4 and 6 that are respectively journaled for rotation on housing 7 on opposite sides of mainshaft 2 in substantial parallel relationship with central rotational axis "c" of mainshaft 2.

Countershafts 4 and 6 carry countershaft gears such as referenced by numerals 8,10,14 and 16 that have teeth that meshingly engage with teeth of mainshaft gears 12 and 18 that encircle and float relative mainshaft 2 in the manner shown in FIGS. 1 and 4 until clutched thereto by axial movement of clutch assemblies referenced by numerals 20 and 22. Clutch assemblies 20 and 22 are moved axially by respective lever arms (not shown).

More specifically, mainshaft gear 12 is supported between and driven by countershaft gears 8 and 10 and cause mainshaft 2 to rotate when clutched thereto by clutch assembly 20. Likewise, mainshaft gear 18 is supported between and driven by countershaft gears 14 and 16 and causes mainshaft 2 to rotate when clutched thereto by clutch assembly 22. The outer surface of mainshaft 2 has a plurality of substantially equally spaced-apart splines that extend axially therealong and along which clutch assemblies 20 and 22 slide when selectively moved by respective lever arms (not shown).

Countershafts 4 and 6 are driven through a gear train (not referenced) by an input rotary shaft 24 which is driven by the vehicle's engine. Mainshaft 2 drives an output shaft 26 that is operatively connected to the vehicle's drive wheels such as through an axle differential.

Axial movement of clutch assemblies 20 and 22 are apt to impart an axial thrust force upon mainshaft gears 12 and 18 respectively during the clutching process. Since gears 12 and 18 are in close proximity to each other, a possibility is created that one might move axially toward and contact the other during the clutching process which could lead to wear and damage.

Accordingly, a thrust washer combination is employed, such as referenced by numerals 28, 70 and 72, that is hereinafter described in greater detail with respect to FIGS. 4 and 5 and is operative to transfer the axial thrust to the mainshaft rather than to an adjacent floating mainshaft gear.

FIG. 2 illustrates a prior art thrust washer combination disclosed in previously described U.S. Pat. No. 4,949,589. In this case, adjacent mainshaft gears 12 and 18 float about mainshaft 48 and have respective adjacent flanges 42 and 44 that extend towards shaft 2 and have annular thrust surfaces 51, 53 and 57, 59 on opposite sides respectively thereof that face axially along shaft 2.

Axially spaced-apart annular grooves 56, 92 and 60 are disposed in the outer surface of shaft 2 that respectively contain thrust washers 70, 28 and 72 that are splined to shaft 2 and secured thereto by means of a key 62 shown in FIG. 3. In particular, a singular key is inserted along one of the spline grooves of shaft 2 requiring that a tooth be removed from the splined inner peripheries of clutch assemblies 22 and 20 as well as from the splined inner peripheries of thrust washers 28, 52 and 70 of the prior art thrust washer combination of FIG. 2. As can be seen in FIG. 2, thrust washers 10, 28 and 70 are all rotated by key 62 which in turn is rotated by shaft 21 and grooves and are are operative to prevent gears 12 and 28 from moving axially as well as to keep them separated from each other.

The improved thrust washer combination of the present invention is shown in FIG. 1 and best described with reference to FIGS. 4 and 5.

In FIG. 4, adjacent transmission mainshaft gears 12 and 18 float about mainshaft 2 and have respective flanges 42 and 44 that extend toward mainshaft 2 that have respective annular thrust surfaces 51, 53 and 57,59 respectively that face axially along shaft 2 in substantial transverse relationship to rotational axis "c" of shaft 2.

Thrust surfaces 53 and 57 face axially towards each other and thrust surfaces 51 and 59 face axially away from each other.

An annular transverse thrust washer groove 92 is disposed in the outer surface of shaft 2 in substantial transverse relationship to rotational axis "c".

Third thrust washer 28 has a splined inner periphery having equi-spaced grooves 86. During assembly, grooves 86 are aligned with splines 98 on the outer surface of shaft 2 and washer 28 is moved axially along shaft 2 into registration with annular groove 92 and rotated to align the respective grooves of washer 28 and mainshaft 2 afterwhich key 90 is inserted through one of the aligned grooves to lock washer 28 to shaft 2.

Thrust washer 28 extends radially outwardly between facing thrust surfaces 53 and 57 and is operative to prevent gears 12 and 18 from engaging each other.

First and second thrust washers 70 and 72 are splined to shaft 2 adjacent thrust surfaces 51 and 59 respectively and are not secured to shaft 2 by means of a key. Annular retaining grooves 96 and 94 are disposed in the outer surface of shaft 2 in substantial transverse relationship rotational axis "c" of shaft 2 respectively adjacent to the side of thrust washers 70 and 72 facing away from each as shown in FIG. 4.

A retaining ring 74 is disposed within groove 96 adjacent the side of thrust washer 70 facing away from flange 42 of gear 12 and a retaining ring 76 is disposed in groove 94 adjacent the side of thrust washer 72 facing away from flange 72 of gear 18. Retaining rings 74 and 76 are preferably snap rings that are not secured for rotation with shaft 2 yet respectively engage thrust washers 70 and 72 to prevent gears 12 and 18 from axially moving away from each other.

The maximum length of key 90 is by the axial length "L" in FIG. 4 that extends between facing surfaces of thrust washers 70 and 72. As previously described in contrast to the prior art, the shortened length of key 90 eliminates the necessity of having to remove a tooth from the splined inner periphery of clutch assemblies 20 and 22 which is desireable since such would lead to diminished contact surface between the mainshaft splines and the splined inner periphery of the clutch assemblies. Since washers 70 and 72 are prevented from moving axially apart by retaining rings 74 and 76 respectively, they are operative to prevent key 90 from moving axially and effectively confine key 90 therebetween even when key 90 is broken.

In operation, the axial thrust imparted to floating mainshaft gear 12 upon engagement of teeth 80 of clutch assembly 20 and teeth 84 of gear 12 is transferred to shaft 2 through thrust washers 28 and 72 and retaining ring 76. Likewise, axial thrust imparted to floating mainshaft gear 18 upon engagement between teeth 82 of clutch assembly 22 and teeth 82 of gear 18 during the clutching process is transferred to mainshaft 2 through thrust washers 28 and 70 and retaining ring 74. It is to be again noted that retaining ring grooves 94 and 96 are characteristically of lesser width than thrust washer grooves and that only thrust washer 28 need be keyed to shaft 2.

What is claimed is:

1. A change gear transmission of the type having a mainshaft journaled for rotation about a central rotational axis and having a plurality of splines extending axially along the outer surface thereof in substantially equally spaced-apart relationship to each other, at least two floating mainshaft gears encircling the mainshaft in axial spaced-apart relationship to each other and having adjacent spaced-apart flanges that respectively extend towards the mainshaft and have annular thrust surfaces on opposite sides thereof that are substantially transverse to the mainshaft rotational axis, clutch means selectively operative to clutch the mainshaft gears to the mainshaft one at a time, and an improved thrust washer combination operative to transmit axial thrust to the mainshaft imparted to the mainshaft gears by the clutch means, wherein the improvement is characterized by said thrust washer combination comprising;

first and second thrust washers splined to the mainshaft respectively adjacent to the annular thrust surface on each mainshaft gear flange that face away from each other, an annular retaining ring groove disposed in the outer surface of the mainshaft in substantial transverse relationship to the mainshaft rotational axis adjacent to a side of the first and second thrust washers respectively facing away from each other, a retaining ring disposed in each retaining groove and operative to prevent the first and second thrust washers from moving axially away from each other, an annular thrust washer groove disposed in the mainshaft between the mainshaft gear flanges in substantial transverse relationship to the mainshaft rotational axis, and a third thrust washer disposed in the thrust washer groove and secured by a key to the mainshaft for rotation therewith and having an annular thrust surface on opposite sides thereof in respective facing relationship to one of the facing annular thrust surfaces on the mainshaft gear flanges, said key confined between the first and second thrust washers and prevented from moving axially along the mainshaft thereby.

2. The transmission of claim 1 wherein the retaining rings are snap rings.

3. The transmission of claim 1 wherein the maximum length of the key for securing the third washer to the mainshaft is the axial distance between facing surfaces of the first and second thrust washers.

4. An improved thrust washer combination for transmitting axial thrust to a change gear transmission mainshaft from a floating mainshaft gear being clutched thereto, said transmission of the type having a mainshaft journaled for rotation about a central rotational axis and having a plurality of splines extending axially along the outer surface thereof in substantially equally spaced-apart relationship to each other, at least two floating mainshaft gears encircling the mainshaft in axial spaced-apart relationship to each other and having adjacent spaced-apart flanges that respectively extend towards the mainshaft and have annular thrust surfaces on opposite sides thereof that are substantially transverse to the mainshaft rotational axis, and clutch means selectively operative to clutch the mainshaft gears to the mainshaft one at a time, wherein the improvement is characterized by said thrust washer combination comprising;

first and second thrust washers splined to the mainshaft respectively adjacent to the annular thrust surface on each mainshaft gear flange that face away from each other, an annular retaining ring groove disposed in the outer surface of the mainshaft respectively in substantial transverse relationshaip to the mainshaft rotational axis respectively adjacent a side of the first and second thrust washers facing away from each other, a retaining ring disposed in each retaining groove and operative to prevent the first and second thrust washers from moving axially away from each other, an annular thrust washer groove disposed in the mainshaft between the mainshaft gear flanges in substantial transverse relationship to the mainshaft rotational axis, and a third thrust washer disposed in the thrust washer groove and secured by a key to the mainshaft for rotation therewith and having an annular thrust surface on opposite sides thereof in respective facing relationship to one of the facing annular thrust surfaces on the mainshaft gear flanges said key confined between the first and second thrust washers and prevented from moving axially thereby.

5. The thrust washer combination of claim 3 wherein the retaining rings are snap rings.

6. The thrust washer combination of claim 3 wherein the maximum length of the key for securing the third washer to the mainshaft is the axial distance between facing surfaces of the first and second thrust washers.

* * * * *